US012390914B2

(12) United States Patent
Wang et al.

(10) Patent No.: US 12,390,914 B2
(45) Date of Patent: Aug. 19, 2025

(54) FASTENER STRIKING TOOL

(71) Applicant: NANJING TOUA HARDWARE & TOOLS CO., LTD., Jiangsu (CN)

(72) Inventors: AiGuo Wang, Jiangsu (CN); FengZhi Chang, JIangsu (CN); QiXiao Zhou, Jiangsu (CN); JinLong Ni, Jiangsu (CN)

(73) Assignee: NANJING TOUA HARDWARE & TOOLSCO., LTD.

( * ) Notice: Subject to any disclaimer, the term of this patent is extended or adjusted under 35 U.S.C. 154(b) by 0 days.

(21) Appl. No.: 18/041,077

(22) PCT Filed: Oct. 9, 2022

(86) PCT No.: PCT/CN2022/123936
§ 371 (c)(1),
(2) Date: Feb. 9, 2023

(87) PCT Pub. No.: WO2023/103570
PCT Pub. Date: Jun. 15, 2023

(65) Prior Publication Data
US 2024/0058931 A1 Feb. 22, 2024

(30) Foreign Application Priority Data
Dec. 7, 2021 (CN) ........................ 202123051528.6

(51) Int. Cl.
*B25C 1/04* (2006.01)

(52) U.S. Cl.
CPC .................................... *B25C 1/047* (2013.01)

(58) Field of Classification Search
CPC ................................ B25C 1/047; B25C 1/06
USPC ........................................................ 227/130
See application file for complete search history.

(56) References Cited

U.S. PATENT DOCUMENTS 11,072,058 B2 * 7/2021 Wyler ....................... B25C 1/06
11,648,653 B2 * 5/2023 Baba ......................... B25C 1/06
227/10

* cited by examiner

*Primary Examiner* — Robert F Long
*Assistant Examiner* — Xavier A Madison
(74) *Attorney, Agent, or Firm* — PROI Intellectual Property US

(57) ABSTRACT

A fastener tool includes a shell, a holder, a striker and a separating structure. The shell is configured to place a compression chamber with gas storage and a cylinder body with a piston inside, and to fix the holder. The holder supports a driving wheel driven by a motor, and provided with a nailing base of which a front end is provided with a gun nozzle, so as to form a nailing passage extending to the gun nozzle from the cylinder body. The striker is provided with a first end and a second end and in driving meshing with the driving wheel. The first end is connected to the piston, and the second end extends to the nailing passage along the gun nozzle direction, so as to move back and forth between a compression limiting position and a nailing limiting position.

12 Claims, 8 Drawing Sheets

FASTENER STRIKING TOOL

TECHNICAL FIELD

The present disclosure relates to a striking tool, in particular to a fastener striking tool, and belongs to the technical field of electric appliances.

BACKGROUND

An electric nail gun is a common fastener tool, which fixes one object onto another object in daily life, such as decoration.

A typical structure of the existing electric nail gun is disclosed by the American patent literature No. U.S. Pat. No. 8,267,297B2 and includes a compression chamber and a cylinder body located in a shell, and a piston is placed in the cylinder body; the shell is fixedly connected to a holder for supporting a driving wheel, and a nailing base, of which a front end is provided with a gun nozzle, is installed in the holder; the piston is connected to a striker extending to the gun nozzle; and one side of the striker is in one-way intermittent meshing with the driving wheel through a ratchet. In order to avoid interference of a one-way intermittent meshing mechanism during movement, a chamber that is directly communicated with a nailing passage in the gun nozzle is disposed in the nailing base communicating with a nail input box. As a result, not only will debris, during a nail striking process, enter through the chamber and cause damage to internal parts of the nail gun, but also once a nail breaking situation that is hard to avoid, a broken nail will enter the meshing mechanism through the chamber along the gun nozzle, resulting in jam and serious damage.

In order to solve this problem, the American patent literature No. U.S. Ser. No. 10/926,385B2 discloses an electric nail gun with a magnet installed on a gun nozzle, the broken nail may be absorbed on the gun nozzle and discharged in a next nailing process, so as to avoid the broken nail entering inside the gun nozzle. However, the practice has proved that the broken nail cannot be effectively absorbed in many cases due to limited magnetic force of the magnet.

SUMMARY

For the above problem in the prior art, through a structure improvement, the present disclosure aims at providing a fastener striking tool capable of preventing foreign matters entering inside, thereby effectively reducing operation failures.

In order to implement the above purpose, the basic technical solution of the fastener striking tool provided by the present disclosure includes:

- a shell, which is configured to place a compression chamber with gas storage and a cylinder body with a piston inside, and to fix a holder;
- the holder, which is configured to support a driving wheel driven by a motor, and provided with a nailing base of which a front end is provided with a gun nozzle, so as to form a nailing passage extending to the gun nozzle from the cylinder body;
- a striker, which is provided with a first end and a second end and in driving meshing with the driving wheel, the first end is connected to the piston, and the second end extends to the nailing passage along the gun nozzle direction, so as to move back and forth between a compression limiting position and a nailing limiting position;

wherein the fastener striking tool further includes:

a separating structure, which is located around the compression limiting position at the second end of the striker, so as to seal a side clearance between the striker and the nailing passage.

After adopting the present disclosure, since the separating structure blocks the passage, through which the debris and the broken nails can enter inside the nail gun during the nailing process, the part damage and jam failures caused by the debris, broken nails and various foreign matters entering inside are effectively avoided.

BRIEF DESCRIPTION OF THE DRAWINGS

The present disclosure is further described below in combination with drawings.

DETAILED DESCRIPTION OF THE EMBODIMENTS

Embodiment I

Figure 1:
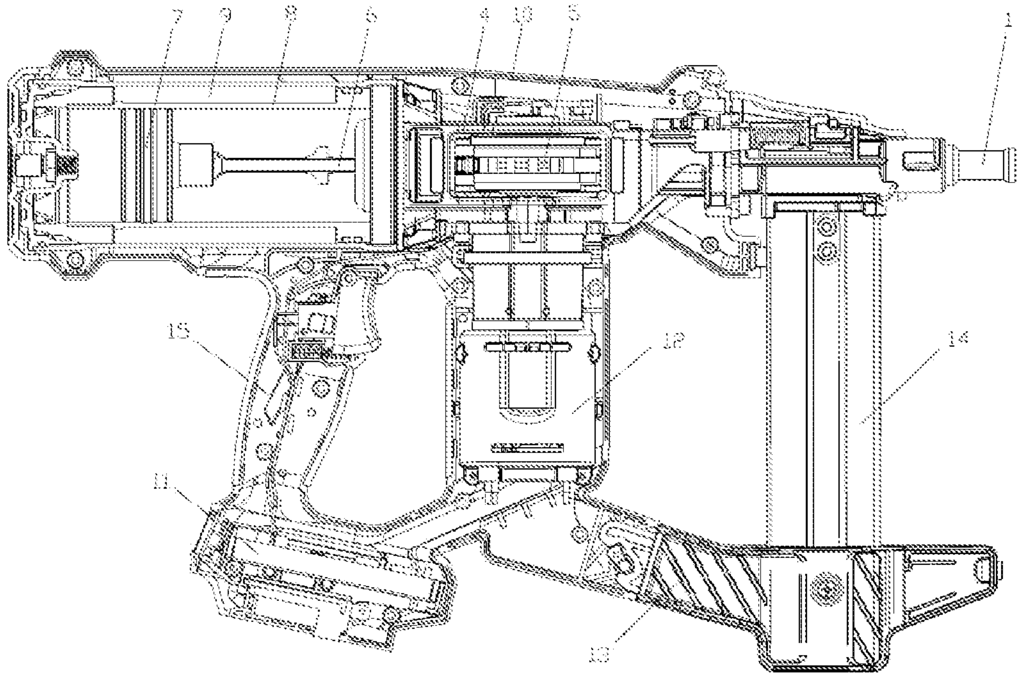
FIG. 1 is a structural schematic diagram of Embodiment I in the present disclosure.
Figure 2:
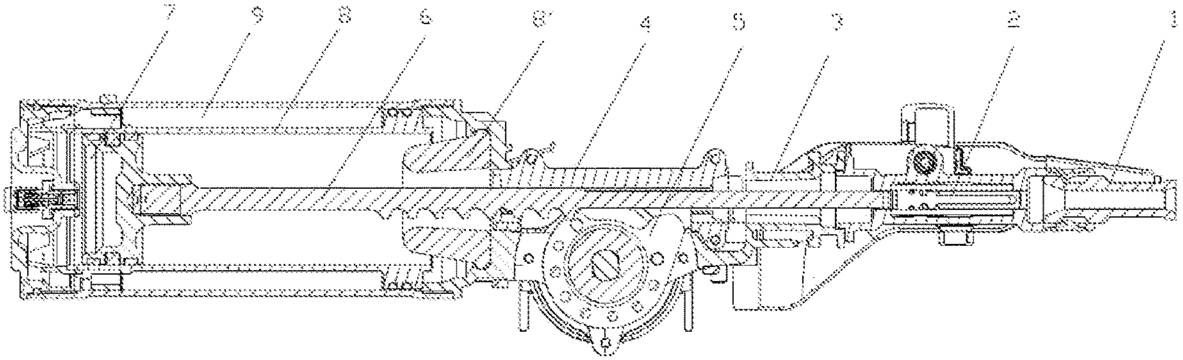
FIG. 2 is a top view after removing a shell in FIG. 1.
Figure 3:
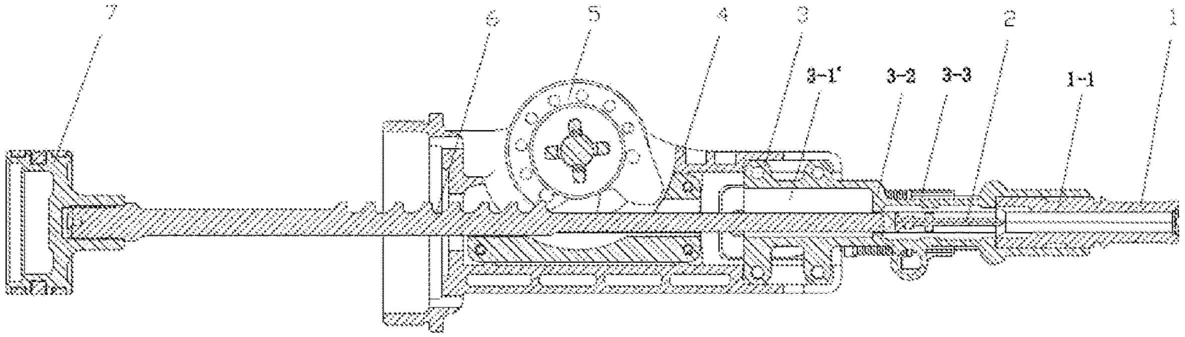
FIG. 3 is a structural schematic diagram of a striking component in a retracting state of Embodiment I in the present disclosure.

A fastener striking tool in this embodiment is as shown in FIG. 1 to FIG. 4, a compression chamber 9 sleeved outside a cylinder body 8 is placed in a shell 10, so as to store compression gas. A piston 7, which can compress air energy storage when moving backwards, and release energy for nailing when moving forwards, is placed in the cylinder body 8. The shell 10 is fixedly connected to a holder 4 for supporting the driving wheel 5, a nailing base 3 of which a front is provided with a gun nozzle 1 is fixedly installed at the front of the holder 4, so as to form a nailing passage 1-1 extending to the gun nozzle 1 from the cylinder body 8. The shell 10 at the cylinder body 8 extends a grab handle 15 with a button switch downwards, the shell 10 at the holder 4 extends a middle support installed with a motor 12 downwards, the motor 12 drives the driving wheel to rotate through a reducer, and a middle of the nailing passage 1-1 is connected to a nail box 14 installed below. A bottom of the grab handle 15 is connected to the middle support by placing a controller 11, and a bottom of the middle support is connected to a bottom of the nail box 14 through a nail box support 13, so as to constitute a Ri-shaped whole structure with better rigidity ("Ri", Pinying of Chinese character).

A front end of the piston 7 is fixedly connected to a first end of a rod-shaped striker 6 through a threaded hole, a second end of the striker 6 extends along the nailing passage 1-1 of the gun nozzle 1, one side of the rod body is provided with a ratchet, and the rod body at the front section of the ratchet is cylindrical. The ratchet of the striker 6 and the driving wheel 4 constitute a one-way intermittent meshing mechanism. The piston 7 drives the striker 6 to move back and forth between a compression limiting position (a retracting state of a striking component) and a nailing limiting position (an emission state of the striking component).

One end, closing to the gun nozzle 1, of the nailing base 3, is provided with a nail containing chamber 3-3 communicating with the nailing passage 1-1, one side of the nail containing chamber 3-3 is provided with a nail box 14, while one end, closing to the piston 7, of the nailing base 3, is provided with an abdicating chamber 3-1' capable of containing the striker ratchet. A separating wall 3-2 is provided between the abdicating chamber 3-1' and the nail containing chamber 3-3, the separating wall 3-2 is provided with a circular through hole adapting to the cylinder at the front section of the striker 6, so as to a separating structure located around the compression limiting position at the second end of the striker 6, to seal a side clearance between the striker 6 and the nailing passage 1-1.

Figure 4:
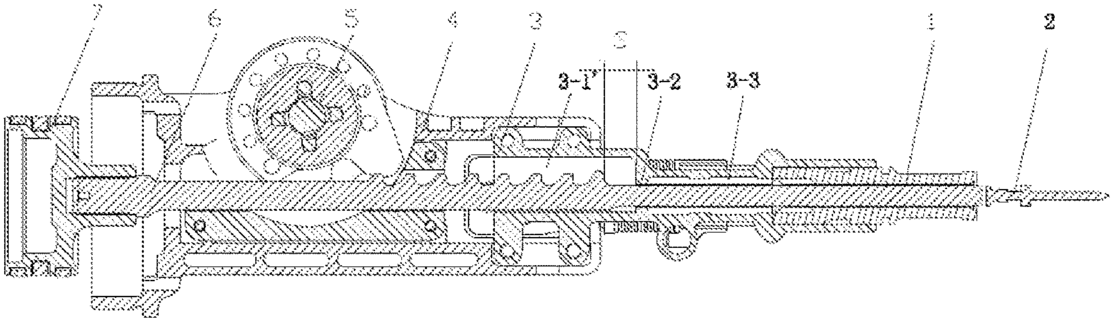
FIG. 4 is a structural schematic diagram of a striking component in an emission state of Embodiment I in the present disclosure.
Figure 5:
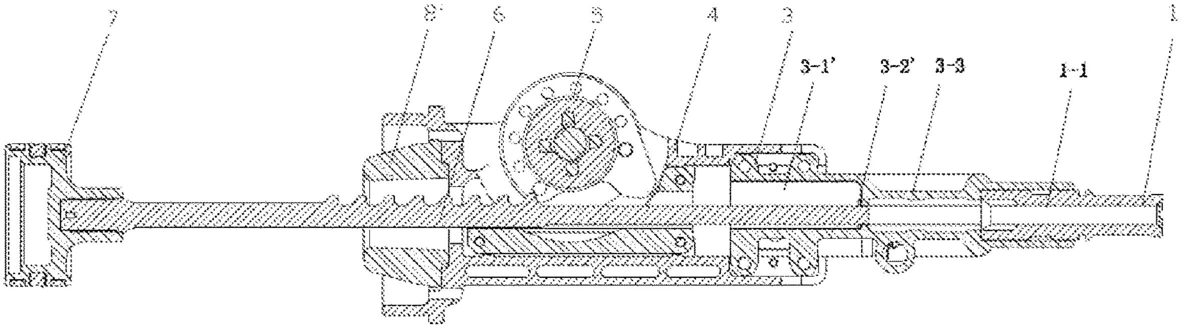
FIG. 5 is a structural schematic diagram of a striking component in a retracting state of Embodiment II in the present disclosure.

In order to ensure to avoid the movement interference, when the striker 6 is located at the nailing limiting position as shown in FIG. 4, the distance S between the ratchet at the foremost end of the striker 6 and the separating wall 3-2 is 6 mm (determined according to the kinetic energy magnitude and the corresponding cushioning stroke at 3-10 mm). In addition, an end face of one end, adjacent to the piston 7, of the holder 4, is sunk and internally provided with an elastic ring 8', with a better buffering and limiting effect.

When the motor 12 drives the driving wheel 5 to rotate, the striker 6 may be driven to drive the piston 7 to move in the cylinder body 8, and the compressed air enters the compression chamber 9 for energy storage. When the driving wheel 5 rotates to its meshing intermittent position, the striker 6 is released instantaneously, and under an action of the compressed air, the nail 2 output to the nail containing chamber 3-3 of the nail base 3 through the nail box 14 is struck. During this process, since the separating wall 3-2 blocks the debris and broken nail to enter the abdicating chamber 3-1' and afterward internal space, the part damage, specifically the jam of the drive mechanism caused by the debris, broken nails and various foreign matters are effectively avoided.

Embodiment II

Figure 6:
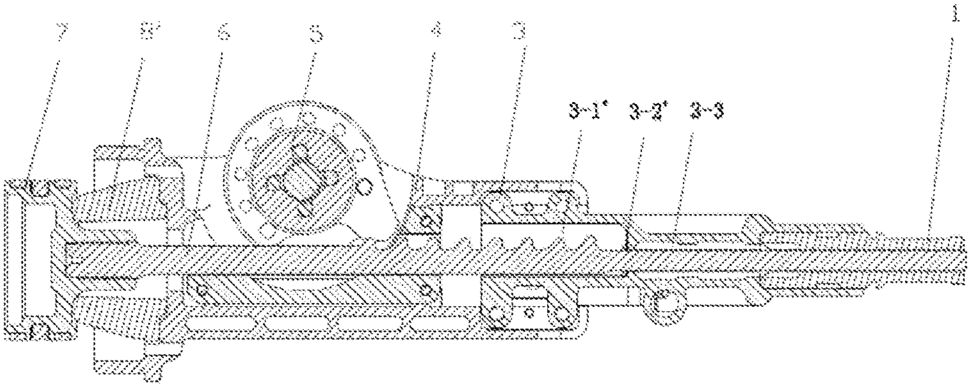
FIG. 6 is a structural schematic diagram of a striking component in an emission state of Embodiment II in the present disclosure.
Figure 7:
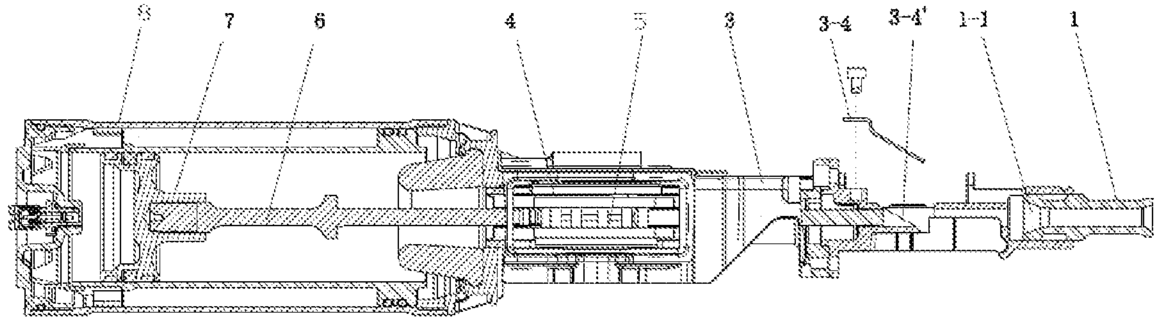
FIG. 7 is a schematic diagram of a section structure of a striking component of Embodiment III in the present disclosure.
Figure 8:
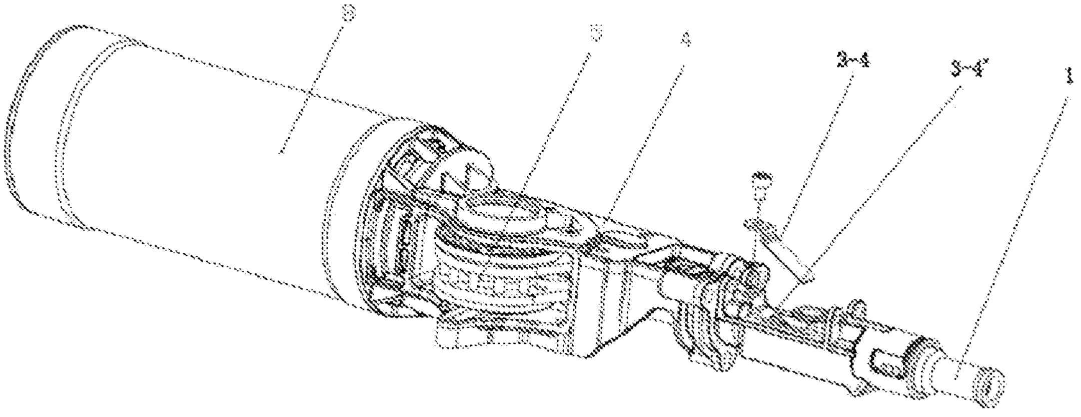
FIG. 8 is a schematic diagram of a solid structure of striking component of Embodiment III in the present disclosure.
Figure 9:
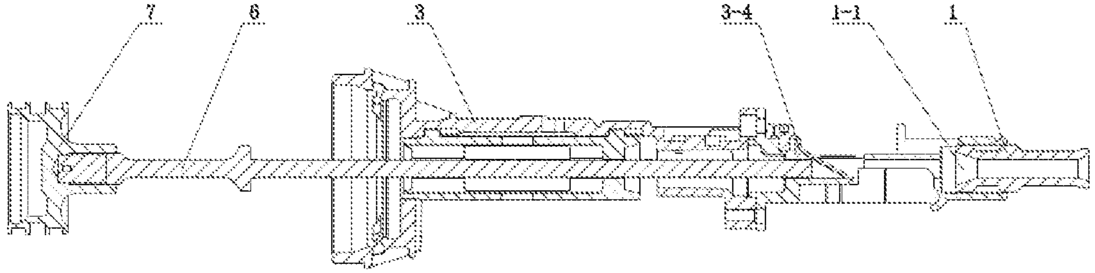
FIG. 9 is a structural schematic diagram of a striking component in an emission state of Embodiment III in the present disclosure.
Figure 10:
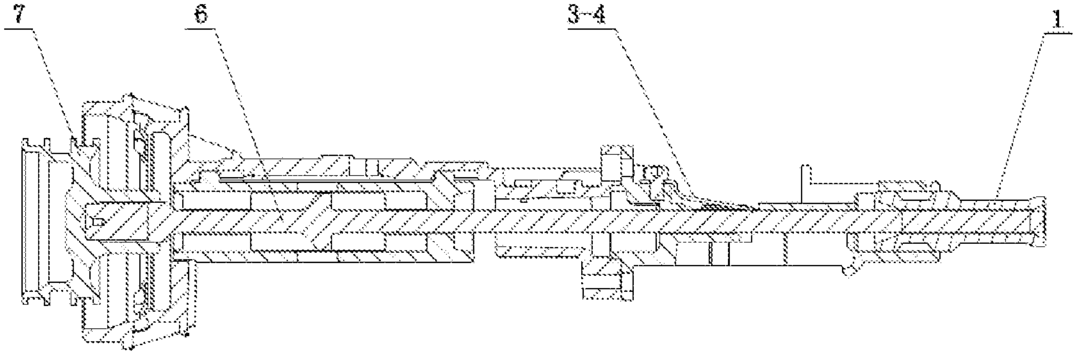
FIG. 10 is a schematic diagram of a striking component in a retracting state of Embodiment III in the present disclosure.

This embodiment is as shown in FIG. Sand FIG. 6, and the main structure is basically the same as the embodiment I. The difference is that a separating ring 3-2' is installed between the abdicating chamber 3-1' and the nail containing chamber 3-3, the separating ring 3-2' is provided with a circular through hole adapting to the cylinder at the front section of the striker 6, so as to constitute the separating structure.

Embodiment III

This embodiment is as shown in FIG. 7 to FIG. 10, and the main structure is also basically the same as the embodiment I. The difference is that, in the striker passage of the nailing passage 1-1 of the gun nozzle 1, a separating locating inclined plane 3-4' inclined downwards is provided, and a separating reed 3-4 is installed at the separating locating inclined plane 3-4'.

When the striker 6 of the striking component is a retracted non-nailing state, an movable end of the separating reed 3-4 seals a front passage of the striker 6. Once the driving wheel 5 rotates to the meshing intermittent position, the striker 6 is released instantaneously, and under the action of the compressed air, the nail in the nailing base 3 is struck. The separating reed 3-4 is jacked to open through the striker so as to strike the outer circular surface of the striker 6 always. After the nailing is finished, the striker 6 is retracted again, the movable end of the separating reed 3-4 is elastically reset, and the front passage of the striker 6 is sealed again. Therefore, the whole working process blocks the debris and broken nail to enter the rear space during the nailing process, so the part damage, specifically the jam of the drive mechanism caused by the debris, broken nails and various foreign matters are effectively avoided.

Embodiment IV

Figure 11:
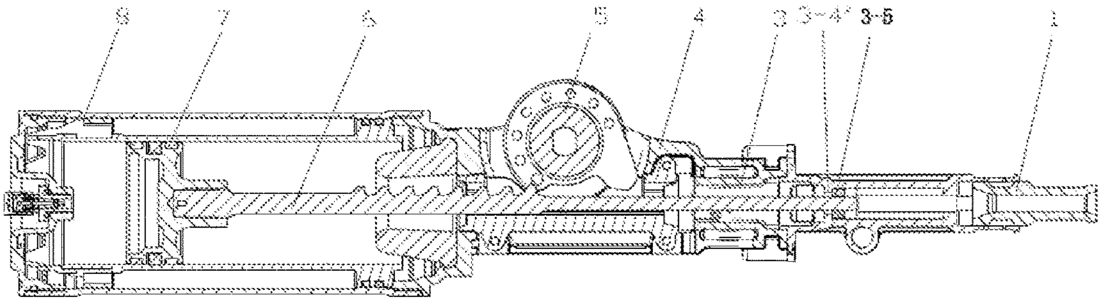
FIG. 11 is a schematic diagram of a section structure of a striking component in an emission state of Embodiment IV in the present disclosure.
Figure 12:
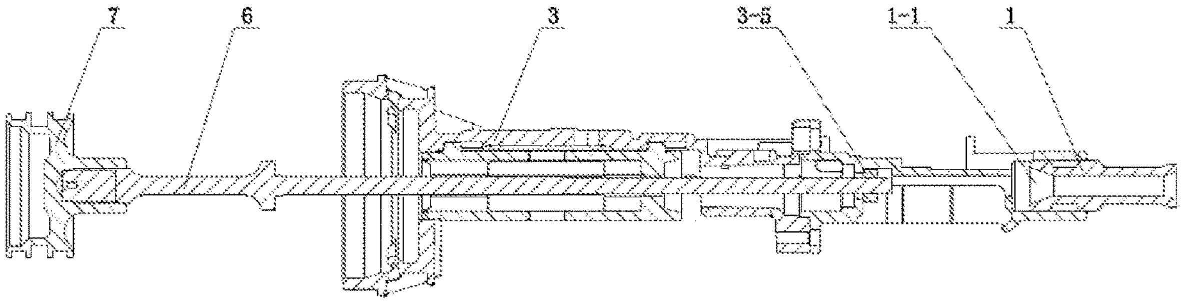
FIG. 12 is a schematic diagram of a local overhead structure in FIG. 11.
Figure 13:
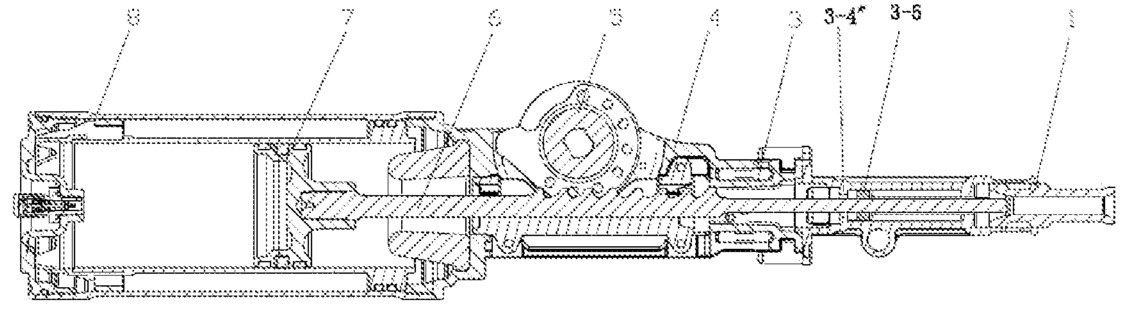
FIG. 13 is a schematic diagram of a section structure of a striking component in a retracting state of Embodiment IV in the present disclosure.
Figure 14:
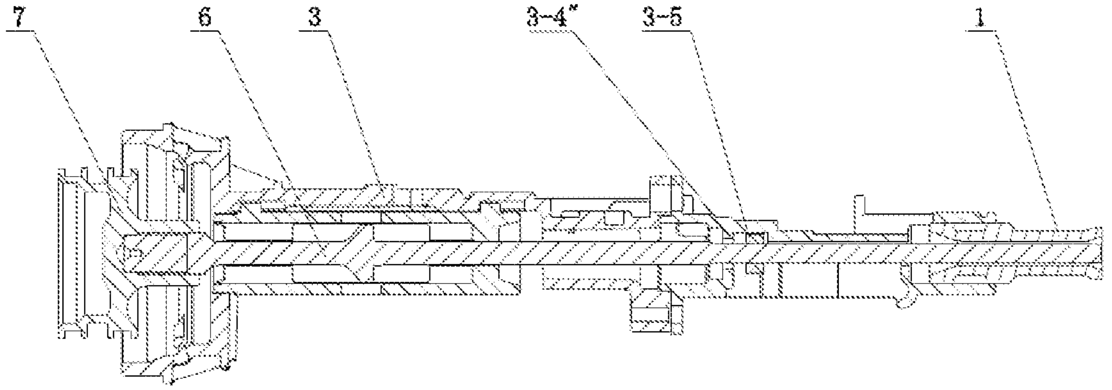
FIG. 14 is a schematic diagram of a local overhead structure in FIG. 13.

The fastener striking tool in this embodiment is as shown in FIG. 11 to FIG. 4, and the main structure is basically the same as the embodiment III. The difference is that the separating wall 3-4" in reducing formation is disposed in the striker passage of the nailing passage 1-1 of the gun nozzle 1 accessed by the nailing base 3, the separating sleeve 3-5 is sleeved at the front section of the striker 6 and a flange is formed at its front end, and when the striker retracting, the flange resists to the separating sleeve 3-5.

When the striker 6 of the striking component is in the non-nailing retracting position, the separating sleeve 3-5 is retracted correspondingly, and the separating wall 3-4" is sealed. When the striker 6 is released to strike the nail in the nailing base 3, the separating sleeve 3-5 is in an axial free state. When the striker is retracted again, the separating sleeve 3-5 seals the separating wall 3-4" again, so as to prevent the debris and the broken nail entering the rear space during the nailing process, and to prevent the jam of the drive mechanism.

In conclusion, the above embodiments may effectively avoid the nailing debris and other foreign matters entering inside of the nail gun, so as to avoid the part damage and jam failure.

In addition to the above embodiments, the present disclosure may have other implementation modes. All technical solutions formed by equal replacement or equivalent transformation all fall into the protective scope of the present disclosure.

What is claimed is:

1. A fastener striking tool, comprising:

a shell, which is configured to place a compression chamber with gas storage and a cylinder body with a piston inside, and the shell is fixedly connected to a holder;

the holder, which is configured to support a driving wheel driven by a motor, and provided with a nailing base of which a front end is provided with a gun nozzle, so as to form a nailing passage extending to the gun nozzle from the cylinder body;

a striker, which is provided with a first end and a second end and in driving meshing with the driving wheel, the first end is connected to the piston, and the second end extends to the nailing passage along the gun nozzle direction, so as to move back and forth between a compression limiting position and a nailing limiting position;

wherein the fastener striking tool further comprises:

a separating structure, which is located around the compression limiting position at the second end of the striker, so as to seal a side clearance between the striker and the nailing passage, wherein one end, adjacent to the gun nozzle, of the nailing base, is provided with nail containing chamber communicating with the nailing passage, and one end adjacent to the piston is provided with an abdicating chamber capable of containing a striker ratchet;

wherein a separating wall is disposed between the abdicating chamber and the nail containing chamber, and the separating wall is provided with a circular through hole adapting to a cylinder at a front section of the striker, so as to form a separating structure.

2. The fastener striking tool according to claim 1, wherein a separating ring is disposed between the abdicating chamber and the nail containing chamber, and the separating ring is provided with a circular through hole adapting to the cylinder at the front section of the striker, so as to form the separating structure.

3. The fastener striking tool according to claim 2, wherein one side of a rod body of the striker is provided with a ratchet that constitutes a one-way intermittent meshing mechanism with the driving wheel, and when the striker is located at the nailing limiting position, a distance between the ratchet at a foremost end of the striker and the separating structure is 3-6 mm.

4. The fastener striking tool according to claim 2, wherein the shell extends a grab handle with a button switch downwards, the shell at the holder extends a middle support downwards, a middle of the nailing passage is connected to a nail box installed below, a bottom of the grab handle is connected to the middle support, and a bottom of the middle support is connected to a bottom of the nail box through a nail box support, so as to constitute a whole structure.

5. The fastener striking tool according to claim 1, wherein one side of a rod body of the striker is provided with a ratchet that constitutes a one-way intermittent meshing mechanism with the driving wheel, and when the striker is located at the nailing limiting position, a distance between the ratchet at a foremost end of the striker and the separating structure is 3-6 mm.

6. The fastener striking tool according to claim 1, wherein a separating locating inclined plane inclined downwards is disposed in the striker passage of the nailing passage, and a separating reed is installed at the separating locating inclined plane, so as to form the separating structure.

7. The fastener striking tool according to claim 6, wherein the shell extends a grab handle with a button switch downwards, the shell at the holder extends a middle support downwards, a middle of the nailing passage is connected to a nail box installed below, a bottom of the grab handle is connected to the middle support, and a bottom of the middle support is connected to a bottom of the nail box through a nail box support, so as to constitute a whole structure.

8. The fastener striking tool according to claim 1, wherein a separating wall in reducing formation is disposed in the striker passage of the nailing passage, a separating sleeve is sleeved at a front section of the striker, and when the striker is at a retracting position, the separating sleeve seals the separating wall, so as to form the separating structure.

9. The fastener striking tool according to claim 8, wherein a flange is formed at a front end of the striker, and when the striker retracts, the flange resists to the separating sleeve.

10. The fastener striking tool according to claim 8, wherein the shell extends a grab handle with a button switch downwards, the shell at the holder extends a middle support downwards, a middle of the nailing passage is connected to a nail box installed below, a bottom of the grab handle is connected to the middle support, and a bottom of the middle support is connected to a bottom of the nail box through a nail box support, so as to constitute a whole structure.

11. The fastener striking tool according to claim 1, wherein the shell extends a grab handle with a button switch downwards, the shell at the holder extends a middle support downwards, a middle of the nailing passage is connected to a nail box installed below, a bottom of the grab handle is connected to the middle support, and a bottom of the middle support is connected to a bottom of the nail box through a nail box support, so as to constitute a whole structure.

12. The fastener striking tool according to claim 1, wherein the shell extends a grab handle with a button switch downwards, the shell at the holder extends a middle support downwards, a middle of the nailing passage is connected to a nail box installed below, a bottom of the grab handle is connected to the middle support, and a bottom of the middle support is connected to a bottom of the nail box through a nail box support, so as to constitute a whole structure.

* * * * *